(12) United States Patent
Shark et al.

(10) Patent No.: US 7,798,947 B2
(45) Date of Patent: Sep. 21, 2010

(54) CUTTING TOOL REMOVAL AND INSTALLATION ASSIST DEVICE

(75) Inventors: Steve Shark, Wapakoneta, OH (US); Brad Bergman, Yorkshire, OH (US); Ryan M. Johnson, Anna, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/749,608

(22) Filed: Mar. 30, 2010

(65) Prior Publication Data

US 2010/0184574 A1  Jul. 22, 2010

Related U.S. Application Data

(62) Division of application No. 12/264,559, filed on Nov. 4, 2008.

(51) Int. Cl.
*B23Q 3/157* (2006.01)

(52) U.S. Cl. .................. 483/1; 483/53; 483/51

(58) Field of Classification Search ............ 483/1, 483/51, 53, 30, 31, 36, 58–61, 65, 66
See application file for complete search history.

(56) References Cited

U.S. PATENT DOCUMENTS

| 2,952,170 | A | | 9/1960 | Hansen et al. | |
|---|---|---|---|---|---|
| 3,431,635 | A | * | 3/1969 | Balding | 483/51 |
| 4,609,326 | A | * | 9/1986 | Roesler | 414/736 |
| 5,688,214 | A | * | 11/1997 | Mase et al. | 483/1 |
| 6,527,686 | B1 | * | 3/2003 | Houser et al. | 483/1 |
| 6,685,608 | B2 | | 2/2004 | Menzio | |
| 6,802,801 | B2 | | 10/2004 | Lasch | |

\* cited by examiner

*Primary Examiner*—Erica E Cadugan
(74) *Attorney, Agent, or Firm*—Rankin, Hill & Clark LLP

(57) ABSTRACT

A method of replacing a cutting tool in a tool magazine in a machine center includes providing a mounting frame having a pair of guide rails and a tool changing jig, pushing the tool changing jig toward the tool magazine until the tool changing jig contacts a rear positive stop, pivoting the clamp arms to an open position, cranking the lifting assembly upward until a V-shaped block assembly contacts the cutting tool, pivoting the clamp arms to a closed position, dislodging the cutting tool from the tool magazine, pulling the tool changing jig away from the tool magazine until the tool changing jig contacts a front positive stop on the mounting frame, replacing the cutting tool in the tool changing jig, and pushing the tool changing jig toward the tool magazine until the cutting tool is inserted and locked into the tool magazine.

7 Claims, 6 Drawing Sheets

CUTTING TOOL REMOVAL AND INSTALLATION ASSIST DEVICE

BACKGROUND

The present disclosure relates to a machining center and more specifically to a machining center with a mill cutting tool and a mill cutting tool changing apparatus to assist the operator in changing the mill cutting tool.

A known cutting tool in a machining center is periodically replaced due to normal wear and tear. The process of changing out the cutting tool is a difficult task because this task is manually performed by the operator without the assistance of a tool changing device.

In some machining centers a known cutting tool, which may weigh upwards of 40-50 pounds, is mounted to a tool magazine located inside the machining center. The tool magazine is set back between 20-30 inches from the front opening of the machining center. Thus, in order to change out the cutting tool, the operator must physically bend over and reach into the machining center and try to balance a 40 pound weight approximately 30 inches away and then re-install a new cutting tool. In most cases, two people are required to change out the cutting tool.

SUMMARY

In accordance with one aspect, a method of replacing a cutting tool in a tool magazine in a machine center is provided that overcomes the above mentioned disadvantages. The method includes providing a mounting frame having a pair of guide rails, and a tool changing jig having a lifting assembly, a pair of clamp arms having a holder at a distal end thereof and a locking lever, a pair of locking clamps, and a V-shaped block assembly, the tool changing jig being slidable along the pair of guide rails, pushing the tool changing jig toward the tool magazine until the tool changing jig contacts a rear positive stop on the mounting frame, pivoting the clamp arms to an open position, cranking the lifting assembly in an upward direction until a V-shaped block assembly contacts the cutting tool, pivoting the clamp arms to a closed position, dislodging the cutting tool from the tool magazine, pulling the tool changing jig away from the tool magazine until the tool changing jig contacts a front positive stop on the mounting frame, replacing the cutting tool in the tool changing jig, and pushing the tool changing jig toward the tool magazine until the cutting tool is inserted and locked into the tool magazine.

DETAILED DESCRIPTION

Figure 1:
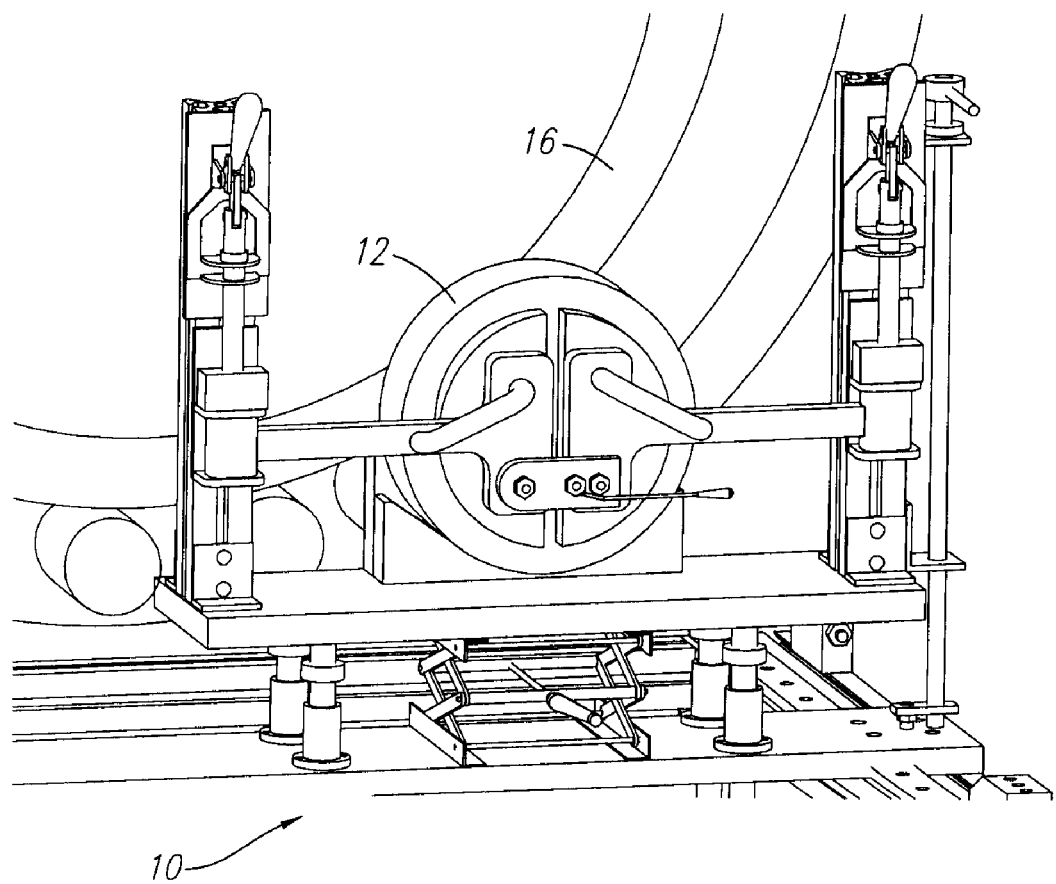
FIG. 1 is a view of a cutting tool changing device positioned inside a machining center.

Referring now to the drawings, FIG. 1 shows a front view of a cutting tool changing device 10 positioned in a machining center such as a CNC machine that performs various milling and brushing functions. As explained above, the cutting tool changing device 10 is designed to assist the operator of the machine center in changing out a cutting tool 12 due to normal usage. The cutting tool 12 includes a shaft 14 and is stored in a tool magazine 16 inside the machining center, and as will become evident from the description below, the cutting tool changing device 10 overcomes the above mentioned disadvantages.

Figure 2A:
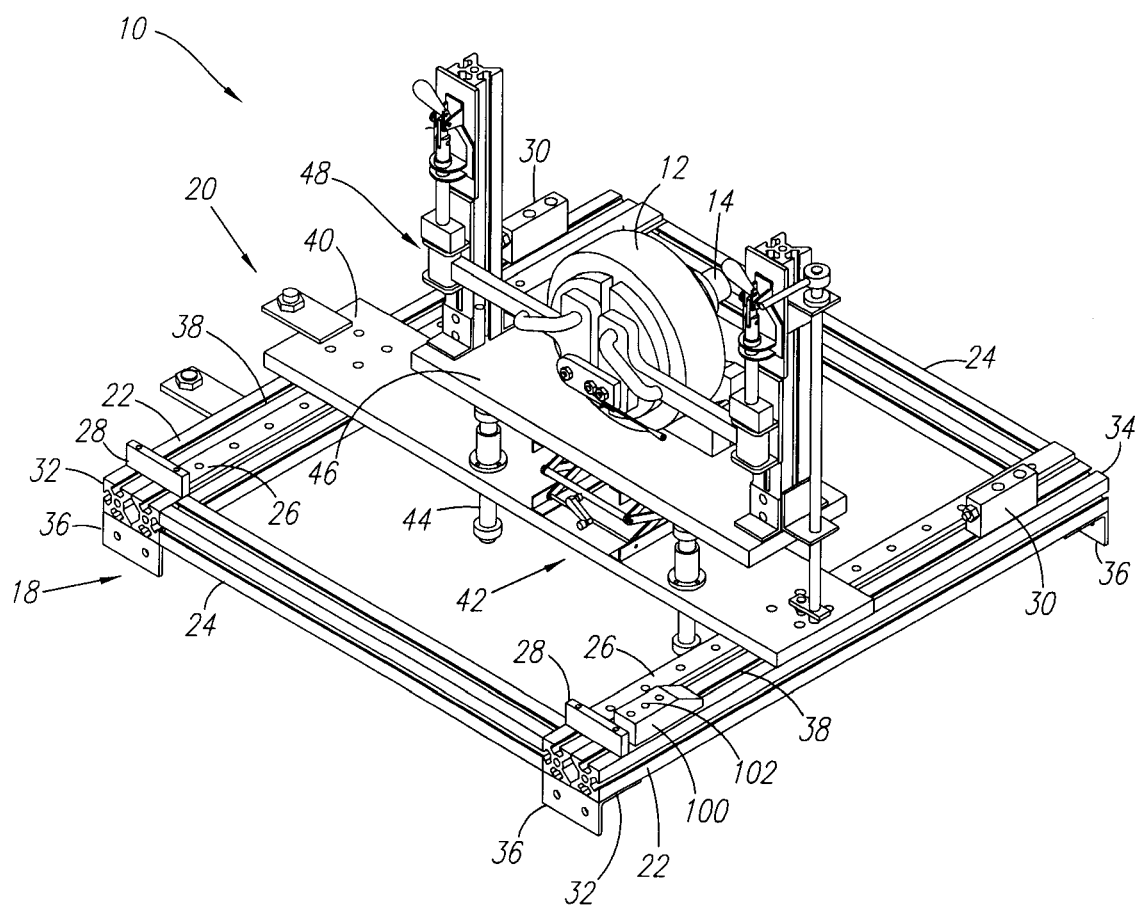
FIG. 2A is a front perspective view of a cutting tool changing device with a pair of clamps arms in a closed position.

Referring to FIG. 2A, the cutting tool changing device 10 includes a mounting frame assembly 18 and a slidable tool changing jig 20 (hereinafter "jig 20").

The mounting frame assembly 18 includes a pair of main supports 22, a pair of cross supports 24 a pair of guide rails 26, a pair of front positive stops 28, and a pair of rear positive stops 30. One cross support 24 is joined to an inside portion near a front portion 32 of each main support 22 and the other cross support 24 is joined to the inside portion near a rear portion 34 of each main support 22. Thus, the main supports 22 and the cross supports 24 are substantially perpendicular to each other thereby forming a rectangular shape. Each main support 22 includes a pair of mounting feet 36, one that extends vertically downward from the front portion 32 of the main support 22 and one that extends vertically downward from the rear portion 34 of the main support 22. Thus, the mounting frame assembly 18 is removably mounted to side walls inside the machining center via the mounting feet 36.

One guide rail 26 is attached to a top surface 38 of each main support 22. The guide rails 26 extend from the front portion 32 of the main support 22 to the rear portion 34 of the main support 22. The jig 20 slides horizontally forward and backwards along the guide rails 26, as will be explained further below.

The front 28 and rear 30 positive stops are removably and slidably attached to the top surface 38 of each main support 22. The front positive stops 28 are located near the front portion 32 of each main support 22 and the rear positive stops 30 are located near the rear portion 34 of each main support 22. The positive stops 28, 30 limit the horizontal forward and backward motion of the jig 20. The front 28 and rear 30 positive stops are secured to the top surface 38 of each main support 22 with a tightening device, such as a set screw. Thus, each positive stop 28, 30 can be moved to any location on the main supports 22 to accommodate multiple applications.

The jig 20 includes a support platform 40, a lifting assembly 42 mounted to the support platform 40, multiple guide columns 44, a lifting platform 46 mounted to the lifting assembly 42, and a cutting tool clamping assembly 48 mounted to the lifting platform 46.

Figure 2B:
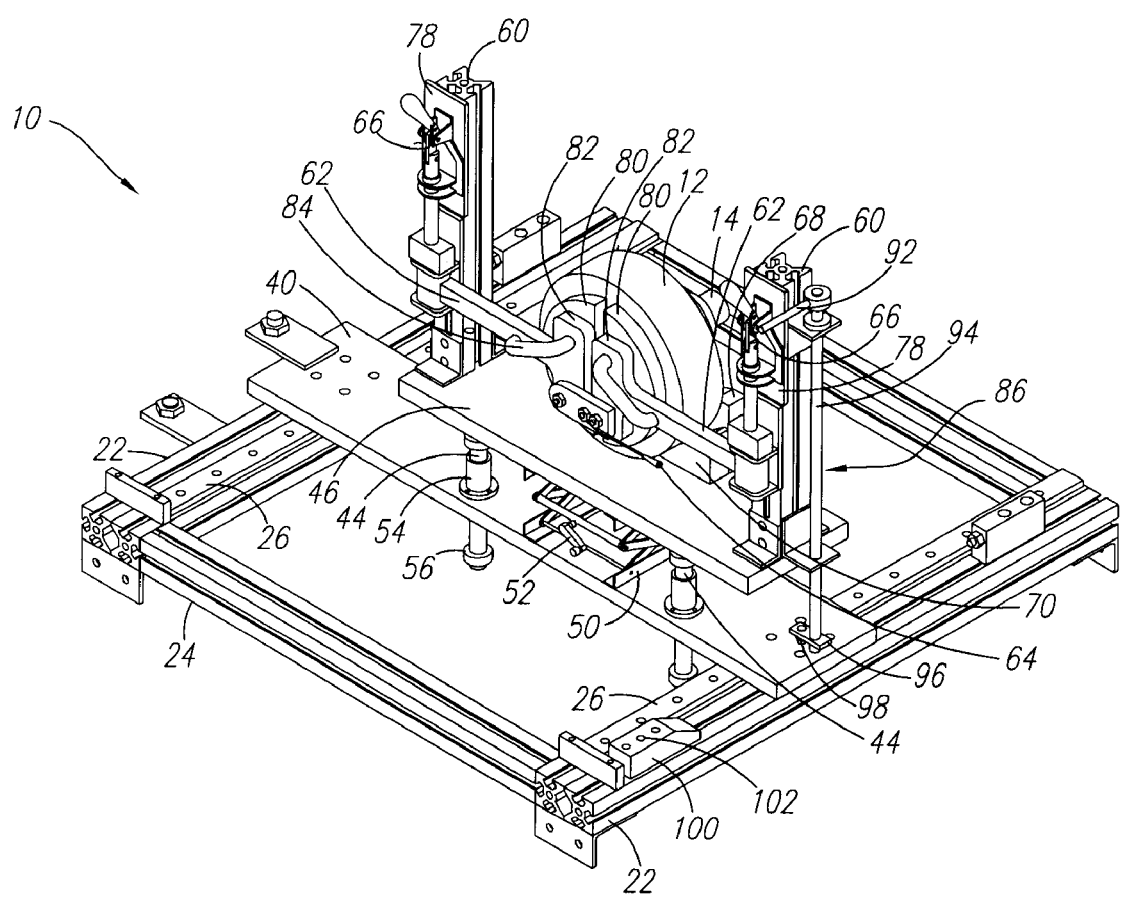
FIG. 2B is the same front perspective view of the cutting tool changing device as FIG. 2A but has been added for simplicity.

Referring to FIG. 2B, the support platform 40 is rectangular in shape and extends between the two main supports 22 such that the support platform 40 contacts a top surface of each guide rail 26. The support platform 40 is attached to the guide rails 26 with an attachment means such that the support platform 40 horizontally slides in a forward and backward direction along the guide rails 26.

The lifting assembly 42 includes a lifting device 50 and a crank handle 52. The lifting device 50 is attached to a bottom side of the lifting platform 46 and may be any type of mechanical lifting device commonly know in the art such as, but not limited to, a jack such as a scissor jack, a screw type jack, etc. The crank handle 52 attaches to a front of the lifting device 50 and upon rotation of the crank handle 52 the lifting device 50 moves vertically in an upward and downward direction. Thus, the lifting assembly 42 moves the lifting platform 46 and the cutting tool clamping assembly 48 vertically in an upward and downward direction.

The multiple guide columns 44 are attached to the bottom surface of the lifting platform 46 and extend downward through guide column openings defined in the support platform 40. Reinforcing collars 54 are attached to the support platform 40 around each guide column opening to provide additional support for the guide columns 44. When the lifting device 50 is actuated to move the lifting platform 46 and the cutting tool clamping assembly 48 in the upward and downward directions, the guide columns 44 also move in the upward and downward directions sliding within the guide column openings and the reinforcing collars 54. Thus, the guide columns 44 provide stability for the cutting tool clamping assembly 48 and prevent the lifting platform 46 from becoming unlevel. Vertical positive stops 56 are attached to a bottom of each guide column 44 to limit the upward motion of the lifting device 50.

Figure 4:
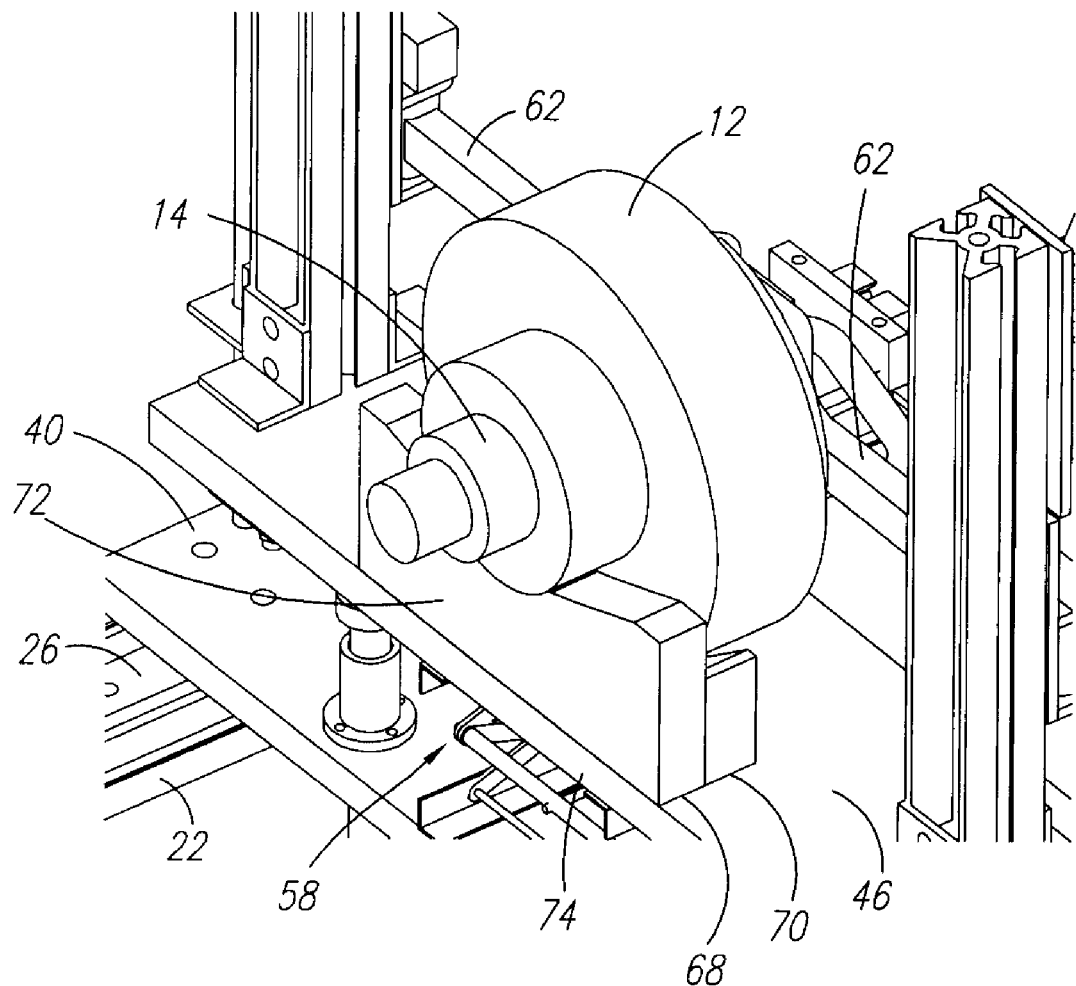
FIG. 4 is a close-up side-rear perspective view of a cutting tool clamping assembly of the cutting tool changing device.
Figure 5:
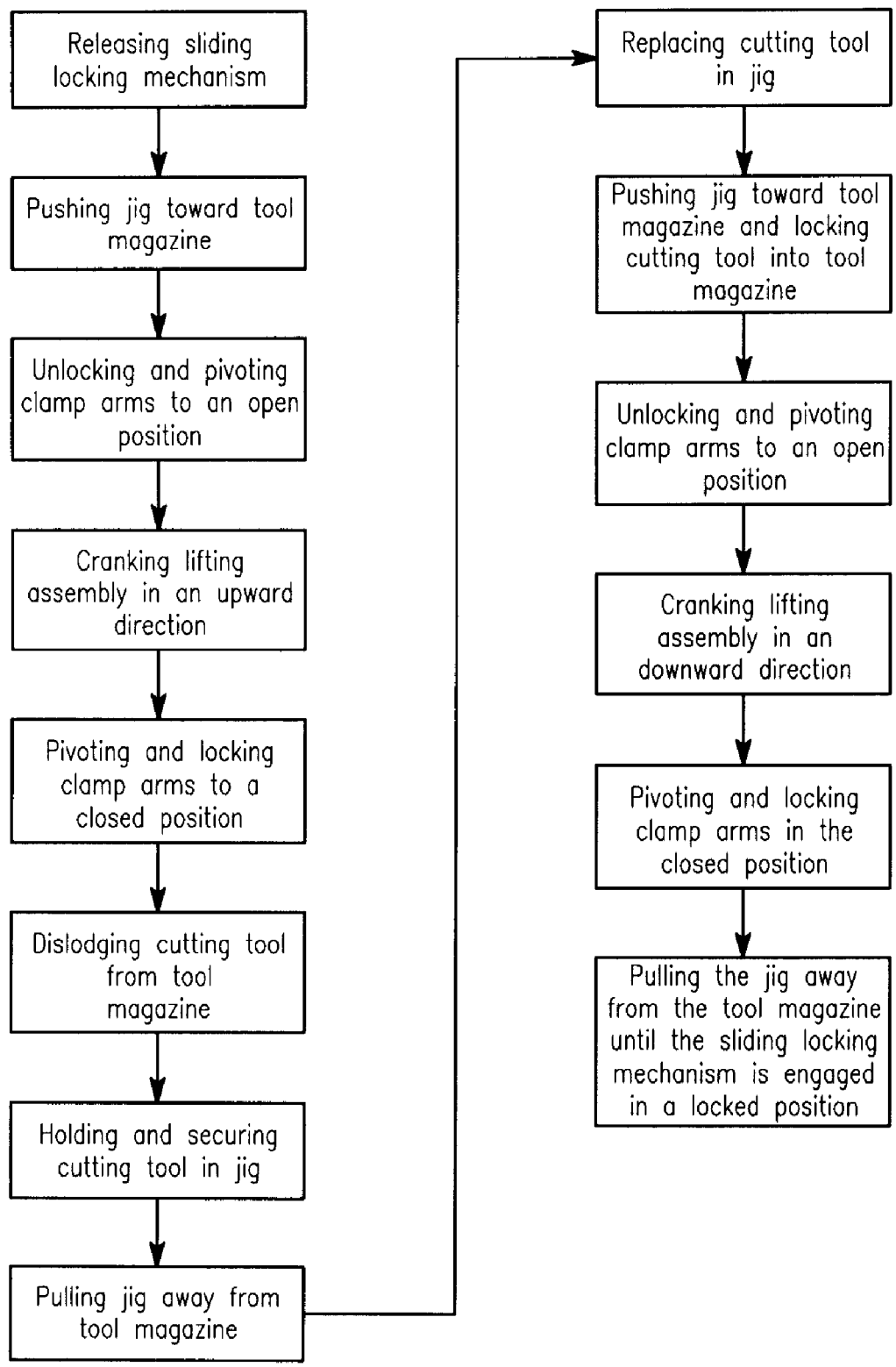
FIG. 5 is a flowchart showing the steps required to change out a cutting tool.

Referring to FIGS. 2B and 4, the cutting tool clamping assembly 48 includes a V-shaped nesting block assembly 58, a pair of vertical support columns 60, a pair of clamp arms 62 with a locking lever 64, and a pair of locking clamps 66. The cutting tool clamping assembly 48 is assembled on a top surface of the lifting platform 46.

The V-shaped nesting block assembly 58 includes a first V-shaped block 68 and a second V-shaped block 70. The first V-shaped block 68 receives a shaft 14 of the cutting tool 12 and the second V-shaped block 70 receives the cutting tool 12, as will be explained further below. Because a diameter of the cutting tool 12 is greater than a diameter of the cutting tool shaft 14, a height of the first V-shaped block 68 is greater than a height of the second V-shaped block 70. The first V-shaped block 68 is mounted to the top surface of the lifting platform 46 such that a rear side 72 of the first V-shaped block 68 is flush with a rear edge 74 of the lifting platform 46, as shown in FIG. 4. The second V-shaped block 70 is mounted to the lifting platform 46 directly in front of the first V-shaped block 68. When mounted, the second V-shaped block 70 may or may not contact the first V-shaped block 68. In other words, when the V-shaped nesting block assembly 58 is mounted, there may or may not be a gap between the first 68 and the second 70 V-shaped blocks. In the embodiment shown in the figures there is no gap between the first 68 and the second 70 V-shaped blocks.

Figure 3:
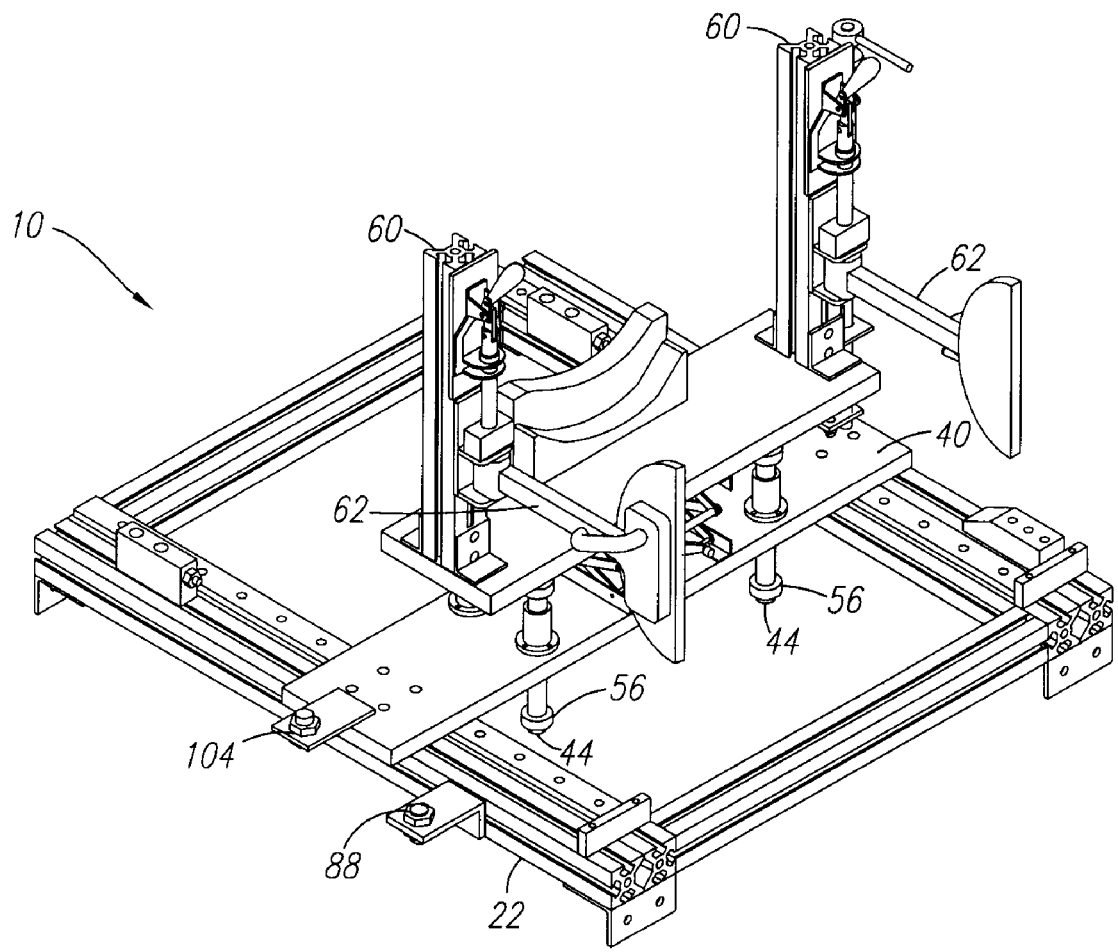
FIG. 3 is a front perspective view from the opposite side of FIG. 2 showing the clamp arms in an open position and the location of a proximity switch.

Referring to FIGS. 2B and 3, the vertical support columns 60 are mounted to the top surface at each end of the lifting platform 46, as shown in FIGS. 2 and 3. The vertical support columns 60 are mounted to the lifting platform 46 with brackets and extend vertically upward from the lifting platform 46.

One clamp arm 62 is pivotally attached to a front side 78 of each vertical support column 60. The clamp arms 62 extend horizontally outward and are, thus, substantially perpendicular to the vertical support columns 60. A holder 80 in the form of a semi-circular shaped disc is attached to a distal end 82 on one side of each clamp arm 62. The holder 80 holds and secures the cutting tool 12 against the first V-shaped block 68 when replacing the cutting tool, as will be explained further below. A handle 84 is attached to the distal end 82 on the opposite side of each clamp arm 62 to allow the operator to pivot the clamp arms 62 from a closed position, as shown in FIGS. 2A and 2B, to an open position, as shown in FIG. 3, and vice versa. In addition, the handles 84 allow the operator to slide the jig 20 in the forward and backward directions to change out the cutting tool 12.

The locking lever 64 is fixedly attached to the distal end 82 on one of the clamp arms 62. When the clamp arms 62 are in the closed position the locking lever 64 engages the distal end 82 of the other clamp arm 62 thereby locking the two clamp arms 62 in the closed position and securing the cutting tool 12 to the V-shaped nesting block assembly 58.

One locking clamp 66 is mounted to the front side 78 of each vertical support column 60 just above the clamp arms 62. When engaged, the locking clamps 66 lock the clamp arms 62 in place to prevent the clamp arms 62 from swinging or pivoting in the horizontal direction during the changing of the cutting tool 12.

The cutting tool changing device 10 further includes a sliding locking mechanism 86 that works in conjunction with a sensing device. The sliding locking mechanism 86 is attached to a side of one of the vertical support columns 60 via brackets and includes a handle 92 located adjacent to the top of the vertical support column 60 and a first bar 94 that extends down from the handle 92 and through openings defined in each bracket. A horizontal plate 96 is attached to the bottom of the first bar 94 and extends inward toward the support platform 40. A second bar 98 is attached to a distal end of the horizontal plate 96 and extends downward through an opening defined in the support platform 40.

The sliding locking mechanism 86 further includes a locking block 100 that is removably and slidably attached to the top surface 38 of the main support 22. The second bar 98 on the sliding locking mechanism 86 engages an opening 102 defined in the locking block 100 when the jig 20 is in a retracted or stored position to thereby secure the jig 20 during operation of the machining center, as will be explained further below.

Referring to FIG. 3, the sensing device includes a proximity switch 88 and a trip dog 104. The proximity switch 88 is located on a side of the main support 22 that is opposite to the main support 22 that includes the locking block 100. The trip dog 104 is attached to the support platform 40 and extends beyond the support platform 40 such that the trip dog 104 engages the proximity switch 88 when the jig 20 is in the retracted position to thereby confirm that the jig 20 is in the stored position.

Referring to FIGS. 1-5, prior to changing out the cutting tool 12, the jig 20 is in the retracted or stored position, which is the position furthest away from the tool magazine 16 and closest to the opening in the machining center. It should be noted, that in this position the lifting device 50 is in a full downward position and the clamp arms 62 are in a closed position.

To change the cutting tool 12 the operator simply disengages the sliding locking mechanism 86 from the locking block 100 by lifting the vertically upward on the handle 92 of the sliding locking mechanism 86. The operator then pushes on the handles 84 on the clamp arms 62 to slide the jig 20 toward the tool magazine 16 until the support platform 40 contacts the rear positive stops 30. After disengaging the locking lever 64, the operator opens the clamp arms 62 and turns the crank handle 52 to move the lifting device 50 in an upward direction until the first 68 and second 70 V-shaped blocks contact the shaft 14 and the cutting tool 12 respectively. The operator then closes the clamp arms 62 and engages the locking lever to secure the clamp arms 62 in the closed position. The operator then uses a tool pry bar to dislodge the cutting tool 12 from the tool magazine 16. When the cutting tool 12 is dislodged from the tool magazine 16 the cutting tool shaft 14 is resting on the first V-block 68 and the cutting tool 12 is resting on the second V-shaped block 70. When the clamp arms 62 are closed the holder 80 contacts a side of the cutting tool 12 opposite that of the side that the shaft 14 is located, and holds and secures the cutting tool 12 against the first V-shaped block 68. The operator then can pull on the handles 84 on the clamp arms 62 to retract the jig 20 toward the opening in the machine center.

The operator now easily replaces the cutting tool 12 by disengaging the locking lever 64 to unlock the clamp arms 62 and pivots the clamp arms 62 to the open position. The operator then engages the pair of locking clamps 66 to prevent the clamp arms 62 from pivoting. The cutting tool 12 is removed from the tool changing jig 20 and a replacement cutting tool 12 is inserted into the tool changing jig 20. The locking clamps 66 are disengaged and the clamps arms 62 are pivoted to the closed position upon which the locking lever 64 is engaged to lock the clamp arms 62 in the closed position.

To reinstall the cutting tool 12, the operator pushes on the handles 84 until the shaft 14 on the cutting tool is engaged and locked into the tool magazine 16. The operator then disengages the locking lever 64 and opens the clamp arms 62 and cranks the lifting assembly 42 in a downward direction. After the lifting assembly 42 is lowered the operator closes and locks the clamp arms 62 with the locking lever 64. The operator retracts the jig 20 until the sliding locking mechanism 86 engages the locking block 100 to thereby secure the jig 20 safely in the stored position.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of replacing a cutting tool in a tool magazine in a machine center comprising:
    providing a mounting frame having a pair of guide rails, and a tool changing jig having a lifting assembly, a pair of clamp arms each having a holder at a distal free end thereof and a locking lever, a pair of locking clamps, and a V-shaped block assembly, the tool changing jig being slidable along the pair of guide rails;
    pushing the tool changing jig toward the tool magazine until the tool changing jig contacts a rear positive stop on the mounting frame; pivoting the clamp arms to an open position;
    cranking the lifting assembly in an upward direction until the V-shaped block assembly contacts the cutting tool;
    pivoting the clamp arms to a closed position; dislodging the cutting tool from the tool magazine;
    pulling the tool changing jig away from the tool magazine until the tool changing jig contacts a front positive stop on the mounting frame;
    replacing the cutting tool in the tool changing jig; and
    pushing the tool changing jig toward the tool magazine until the cutting tool is inserted and locked into the tool magazine.

2. The method of claim 1 further comprising:
    disengaging the locking lever to unlock the clamp arms;
    pivoting the clamp arms to the open position;
    cranking the lifting assembly in a downward direction;
    pivoting the clamp arms to the closed position;
    engaging the locking lever to lock the clamp arms in the closed position;
    pulling the tool changing jig to a retracted position;
    engaging a sliding locking mechanism into a locking block mounted to the mounting frame; and
    confirming that the tool changing jig is in the retracted position with a sensing device.

3. The method of claim 2, wherein replacing the cutting tool in the tool changing jig includes:
    disengaging the locking lever to unlock the clamp arms;
    pivoting the clamp arms to the open position;
    engaging the pair of locking clamps to prevent the clamp arms from pivoting;
    removing the cutting tool from the tool changing jig;
    inserting a replacement cutting tool into the tool changing jig;
    disengaging the pair of locking clamps;
    pivoting the clamps arms to the closed position; and
    engaging the locking lever to lock the clamp arms in the closed position.

4. The method of claim 3, wherein prior to pivoting the clamp arms to an open position after the rear positive stop has been contacted, the method comprising disengaging the locking lever to unlock the clamp arms.

5. The method of claim 4, wherein prior to pushing the tool changing jig toward the tool magazine until the tool changing jig contacts the rear positive stop located on the mounting frame, the method further comprising disengaging the sliding locking mechanism from the locking block.

6. The method of claim 5, wherein prior to dislodging the cutting tool from the tool magazine, the method further comprising engaging the locking lever to lock the clamp arms in the closed position.

7. The method of claim 6, wherein prior to pulling the tool changing jig away from the tool magazine until the tool changing jig contacts the front positive stop located on the mounting frame, the method further comprising holding and securing the cutting tool on the V-shaped block assembly with the holders of the clamp arms.

\* \* \* \* \*